(12) United States Patent
Chen et al.

(10) Patent No.: US 7,433,521 B2
(45) Date of Patent: Oct. 7, 2008

(54) METHOD AND APPARATUS FOR DISPLAYING MULTIMEDIA INFORMATION

(75) Inventors: Jeng-Chun Chen, Taipei (TW); Wei-Cheng Lin, Yung Ho (TW); Jyh-Kuen Horng, Kaohsiung (TW)

(73) Assignee: Arcadyan Technology Corporation, Hsinchu (TW)

( * ) Notice: Subject to any disclaimer, the term of this patent is extended or adjusted under 35 U.S.C. 154(b) by 926 days.

(21) Appl. No.: 10/890,023

(22) Filed: Jul. 13, 2004

(65) Prior Publication Data

US 2005/0213827 A1    Sep. 29, 2005

(30) Foreign Application Priority Data

Mar. 26, 2004    (TW) .............................. 93108428 A

(51) Int. Cl.
*G06K 9/36*    (2006.01)
(52) U.S. Cl. ...................................... 382/232
(58) Field of Classification Search ................ 382/190, 382/232, 233, 240; 709/219
See application file for complete search history.

(56) References Cited

U.S. PATENT DOCUMENTS

2005/0031206 A1*    2/2005    Kaneko et al. ............... 382/190

* cited by examiner

*Primary Examiner*—Duy M Dang
(74) *Attorney, Agent, or Firm*—Thomas, Kayden, Horstemeyer & Risley

(57) ABSTRACT

A data source apparatus, such as a computer, is connected to a remote device, such as a wireless projector, via a transmission channel, such as a wireless network, so that the remote device shows display images of the data source apparatus. Updated regions of the data source apparatus are detected and analyzed. Corresponding compression methods are then selected according to the characteristics of the updated regions. Then, the updated regions are compressed using the selected compression methods, and the compressed data accompanied by meta data indicating the type of the compression methods and coordinate values of the updated regions are then transmitted to the remote device. Then, the remote device updates its display according to the received data.

21 Claims, 5 Drawing Sheets

METHOD AND APPARATUS FOR DISPLAYING MULTIMEDIA INFORMATION

BACKGROUND OF THE INVENTION

1. Field of Invention

The present invention relates to a method and apparatus for displaying multimedia information. More particularly, the present invention relates to a method and apparatus for displaying multimedia information on a remote device.

2. Description of Related Art

As electronic technologies advance and due to the needs of people, data are stored and displayed in diverse forms. For instance, people use applications software to prepare presentation documents, and use a projector connected with a computer instead of making transparencies or slides. These ways of storing and displaying data can avoid unnecessary printing costs, and provide flexibility in arranging data and data reusability.

The connection between a computer and a projector being an example, mutual compatibility between various electronic devices also usually provides great convenience. For example, one carries a PDA (Personal Digital Assistant) on his person and uses it to record things. When preparing a presentation, the PDA is conveniently connected to a projector to use the data stored in the PDA. In another instance, it is beneficial and favorable that data, such as presentation documents, stored in the computer be transferred and output to devices, such as PDAs or televisions, when a meeting is being held. The employment of methods like these enhances desirable functions in people's lives, and brings about efficient life styles.

However, although nowadays wired and wireless communication technologies are continuously developing, problems often arise due to limited bandwidths when electronic devices need to transmit multimedia data to one another.

SUMMARY OF THE INVENTION

An objective of the present invention is to provide a method and apparatus for displaying multimedia data on a remote device.

According to an embodiment of the invention, data of a frame from a multimedia data source are transmitted to a remote device via a transmission channel in order to be displayed on the remote device. The method used in the embodiment includes the following steps. First, an updated region in the frame is detected. Next, a corresponding compression method according to the characteristics of the updated region is determined. The characteristics of the updated region include, for example, the color entropy of the updated region. If the color entropy is higher than a threshold value, the updated region contains natural images data, and a compression method, such as JPG (Joint Photographic Experts Group), is suitable. If the color entropy is lower than the threshold value, the updated region contains synthetic image data, and a compression method, such as PNG (Portable Network Graphics), is suitable. Next, the updated region is compressed to obtain compressed data by using the corresponding compression method. The compressed data, coordinates of the updated region, and the type of the corresponding compression method are then transmitted to the remote device via the transmission channel. Finally, a display on the remote device is updated according to the compressed data, the coordinates of the updated region, and the type of the corresponding compression method.

In conclusion, the invention allows the following advantages. First, since only the data of the updated regions after compression are transmitted to the remote device, the amount of data necessary to be transmitted is reduced, so the method of the invention is more suitable for and adapts more easily to environments with bandwidth limitations, such as an application where the transmission channel is a wireless network. In addition, since the compression method is determined according to the characteristics of the updated region, a high enough compression rate may be attained without degrading the display quality, so the amount of data necessary to be transmitted is less and this method is thereby applicable to various applications. Furthermore, the concepts of the invention can easily be extended to use for a combination of multimedia data sources and remote devices, increasing the variety of applications. Accordingly, the invention truly provides an advantageous plan for the display of multimedia data and the interaction between involved electronic devices.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

A description of a preferred embodiment according to the present invention is as follows.

Figure 1:
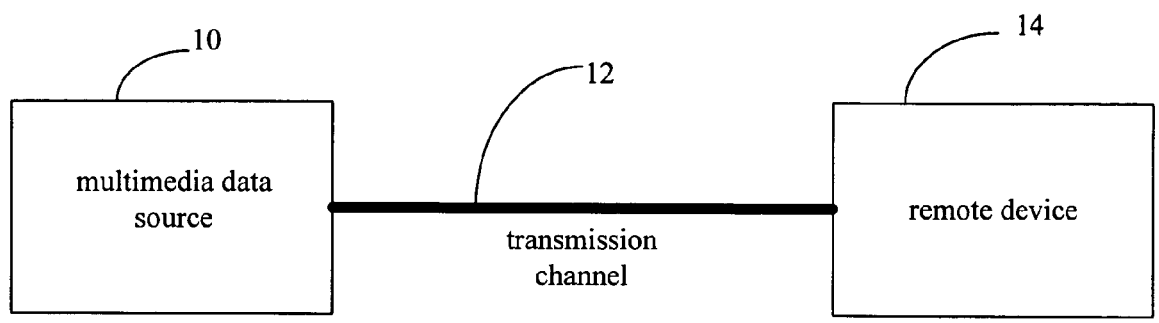
FIG. 1 illustrates a configuration of devices according to an embodiment of the present invention.

FIG. 1 illustrates a configuration of devices in the embodiment. A multimedia data source 10 is connected to a remote device 14 through a transmission channel 12. One of the purposes of this connection is to display a frame containing data from the multimedia data source 10 on the remote device 14. The multimedia data source 10 refers to any device, e.g., general-purpose or special computers of any kind, PDAs, or televisions, containing multimedia data, including text, graphics, sound, and video. The transmission channel 12 comprises hardware and/or software of a wired or wireless data transmission path of any kind for transmitting data. The remote device 14 refers to any electronic device, relative to the multimedia data source 10, capable of producing display frames. The remote device 14 can be, for example, a projector, a computer, a PDA, or a cell phone.

Figure 2:
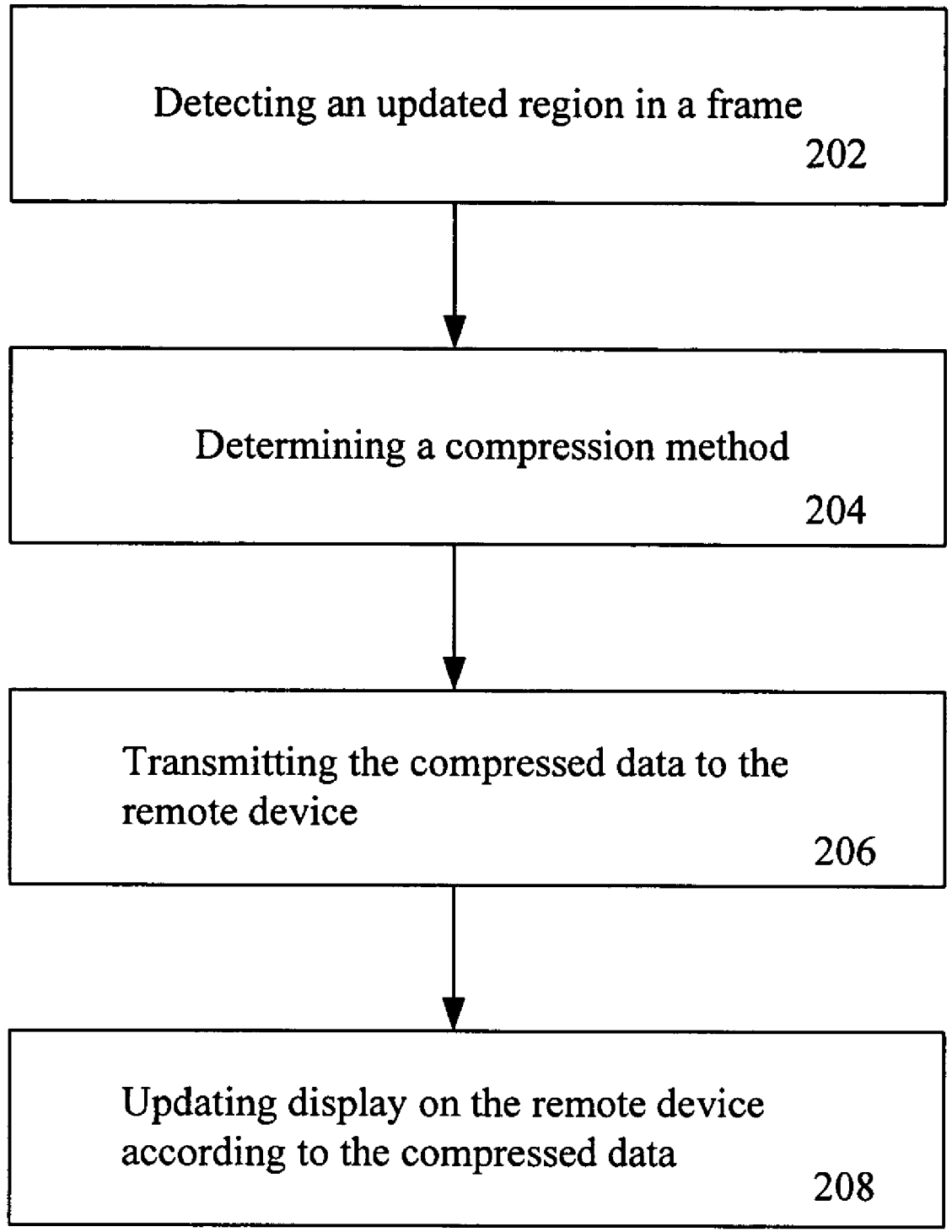
FIG. 2 illustrates a flow chart of the steps performed according to the embodiment of the present invention.

FIG. 2 illustrates a flow chart of the steps performed in the embodiment. Since amounts of multimedia data, such as frame data, are often very large, and the bandwidths of the transmission channel are very limited, transmitting the whole frame directly to the remote device 14 every time a frame update occurs at the multimedia data source 10 is not practical or efficient. In this embodiment, detecting an updated region in the frame at the multimedia data source 10 is first performed (step 202).

Figure 3:
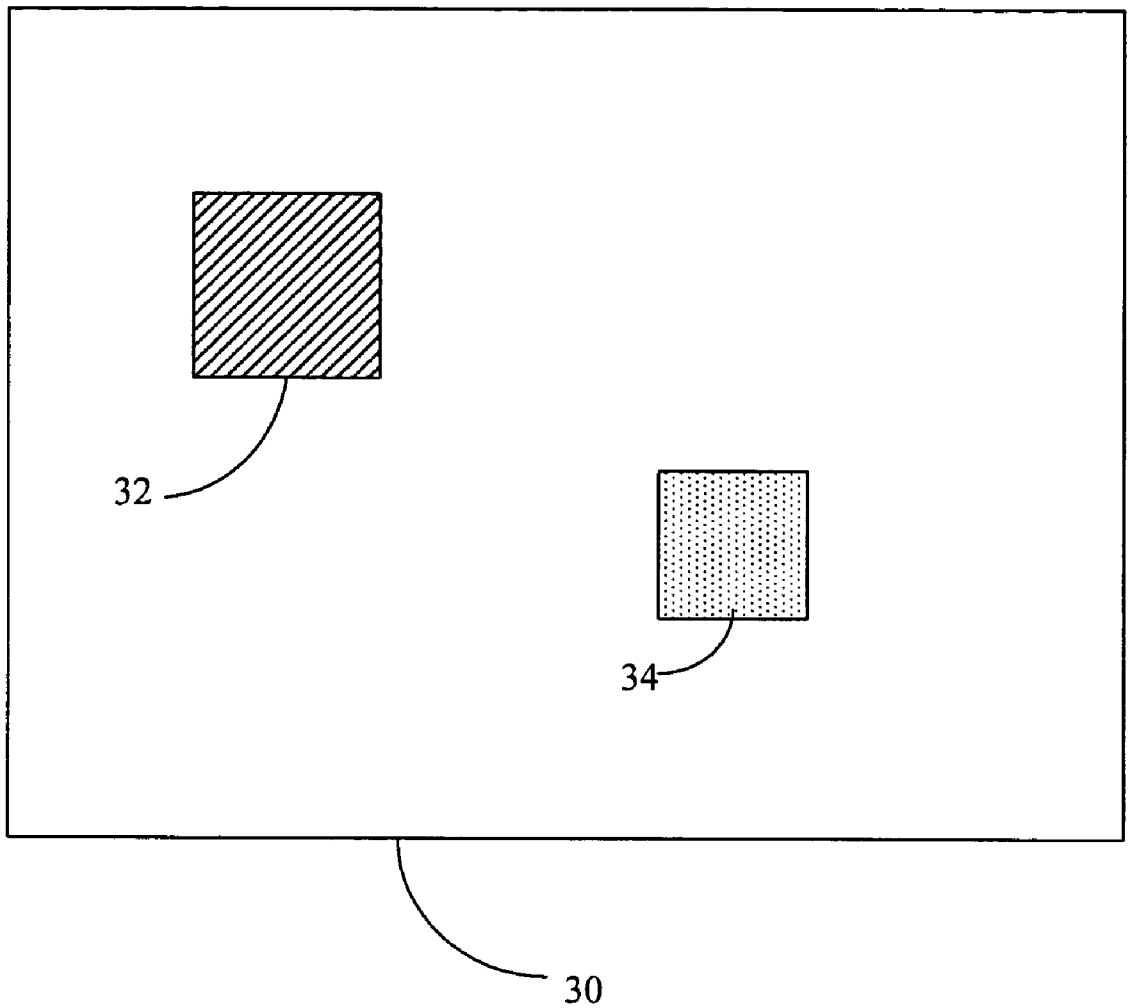
FIG. 3 illustrates the detection of updated regions in a frame.

FIG. 3 illustrates the detection of updated regions in the frame. For instance, when the multimedia data source 10 is a computer and the remote device 14 is a projector, a mechanism implemented by software, hardware, or a combination of software and hardware can be added to the computer to examine the computer's video frame buffer, which is a kind of memory. By this mechanism, the history data between successive instances of examination are then compared to detect updated regions. For instance, in the whole frame 30 on the screen of the computer, there may be only two updated regions 32 and 34 in which data are changed. In this case, only the two updated regions 32 and 34 need to be processed, and therefore the transmission bandwidth is saved and the cost of processing is reduced.

Next, after the updated regions 32 and 34 are detected, a corresponding compression method is determined according to the characteristics of the two updated regions 32 and 34 (step 204). For a frame with multimedia data, the two most common kinds of data are from synthetic images, such as texts, lines, and figures, and from natural images, such as photographs. The two kinds of data both have their suitable compression methods, respectively. For example, PNG and GIF (graphics interchange format) compression methods can be used for synthetic images, while the JPG compression method can be used for natural images. In this embodiment, therefore, different compression methods may be chosen according to the characteristics, such as containing synthetic images or natural images, of the updated regions.

A way of judging the updated regions to contain synthetic images or natural images is to evaluate the color entropy of the updated regions. According to experimental results, synthetic images and natural images have different color entropies. Therefore, a threshold value of the color entropy of the updated regions, which is used to distinguish synthetic images from natural images, can be determined by experiment and statistics. The color entropy of an updated region containing natural images is higher than the threshold value, while the color entropy of an updated region containing synthetic images is lower than the threshold value. As long as the color entropy of an updated region is calculated and evaluated, that is, the degree of randomness between pixels is evaluated, the type of the compression method can be determined to correspond with natural images or synthetic images.

Furthermore, for an identical compression method, normally there are other parameters that can be varied. For example, the compression method can be determined by reference to the characteristics of the transmission channel. When a projector with lower resolution is used as the remote device 14 and a wireless network with lower bandwidths is used as the transmission channel, parameters of the compression method may be varied or the compression method may be changed, in order to deal with the difficulties. Additionally, adjusting the magnification of the image of an updated region is also possible for certain applications.

Next, the determined compression method is used to compress the updated regions, and the compressed data are transmitted to the remote device 14 (step 206). Certainly, coordinates of the updated regions and the type of the compression method, which are related to the compressed data, are also transmitted to the remote device 14 via the transmission channel 12.

When the remote device 14 receives the data, a display on the remote device 14 is updated according to the compressed data, the coordinates of the updated regions, and the type of the compression method (step 208).

As described above, this embodiment involves the multimedia data source 10 and the remote device 14. In order for the two devices to be able to communicate with each other, corresponding built-in or external apparatus comprising hardware, software, or a combination of hardware and software have to be coupled to the multimedia data source 10 and the remote device 14, respectively. The following description explains the construction of the added apparatus with reference to FIGS. 4 and 5.

Figure 4:
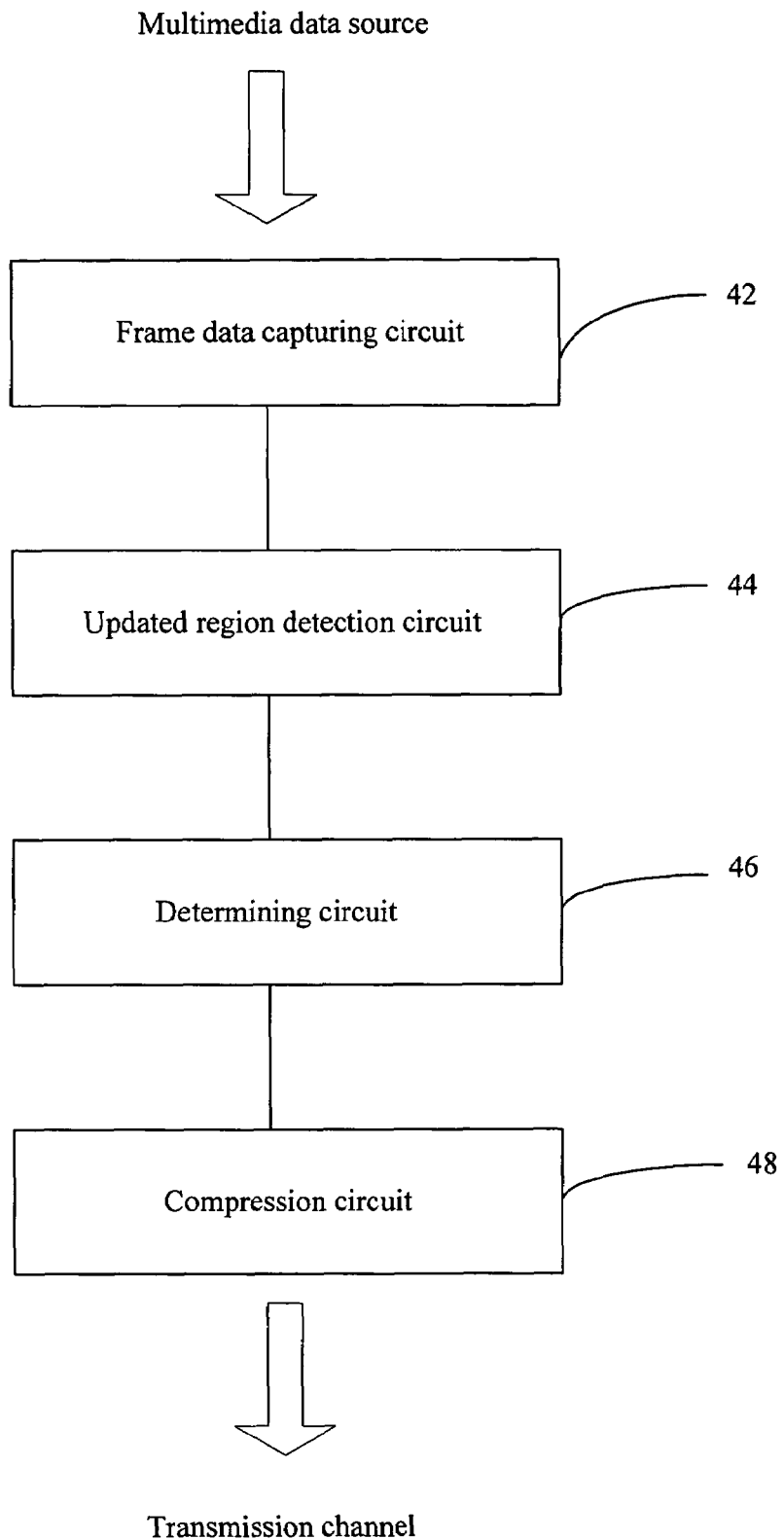
FIG. 4 illustrates an example of an apparatus of the invention.

FIG. 4 illustrates an example of an apparatus coupled to and used at the multimedia data source 10. First, the apparatus has a frame data capturing circuit 42, an updated region detection circuit 44, a determining circuit 46, and a compression circuit 48. These circuits of the apparatus can be integrated and built inside the multimedia data source 10, such as a computer, or completely/partially realized as external devices. The frame data capturing circuit 42 captures data of a frame from the multimedia data source 10. For example, the frame data capturing circuit 42 reads the video frame buffer of a computer, which is used as the multimedia data source 10. The updated region detection circuit 44 detects an updated region in the frame from the data of the frame. The determining circuit 46 determines a corresponding compression method according to the characteristics of the updated region, such as the color entropy of the updated region. The compression circuit 48 compresses the updated region to obtain compressed data by using the corresponding compression method, and then the compressed data, coordinates of the updated region, and the type of the corresponding compression method are transmitted to the remote device 14 via the transmission channel 12.

Figure 5:
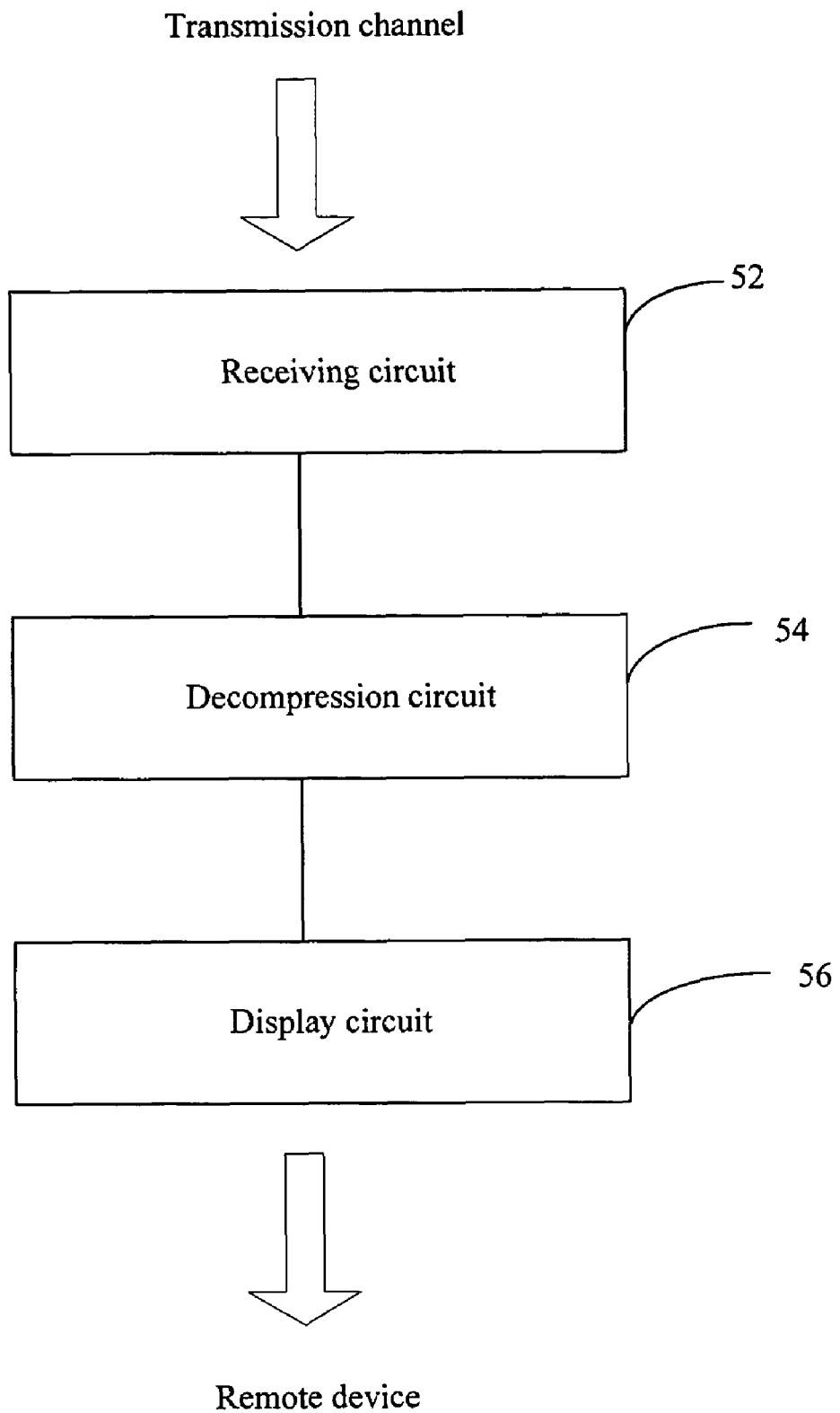
FIG. 5 illustrates an example of another apparatus of the invention.

FIG. 5 illustrates an example of an apparatus coupled to the remote device 14 and the transmission channel 12. The apparatus has a receiving circuit 52, a decompression circuit 54, and a display circuit 56. The receiving circuit 52 receives the compressed data of the updated region, the coordinates of the updated region, and the type of the compression method from the transmission channel 12. The decompression circuit 54 decompresses the compressed data to obtain data of the updated region according to the type of the compression method. The display circuit 56 transmits the data of the updated region to the remote device 14, such as a projector, according to the coordinates of the updated region for updating a display on the remote device 14.

Although the present invention has been described in considerable detail with reference to certain preferred embodiments thereof, other embodiments are possible. Therefore, the spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for displaying multimedia data on a remote device, comprising:
    detecting an updated region in a frame containing data from a multimedia data source;
    determining a corresponding compression method according to characteristics of said updated region;
    compressing said updated region to obtain compressed data by using said corresponding compression method;
    transmitting said compressed data, coordinates of said updated region, and a type of said corresponding compression method to said remote device via a transmission channel; and updating a display on said remote device according to said compressed data, said coordinates of said updated region, and said type of said corresponding compression method.

2. The method of claim 1, wherein said characteristics of said updated region comprise a color entropy of said updated region.

3. The method of claim 2, wherein a threshold value of the color entropy of said updated region is determined by experiment, and when the color entropy of said updated region is higher than said threshold value, then the type of said compression method corresponds with natural images, and when the color entropy of said updated region is lower than said threshold value, then the type of said compression method corresponds with synthetic images.

4. The method of claim 3, wherein the type of said compression method corresponding with natural images comprises a JPEG compression method.

5. The method of claim 3, wherein the type of said compression method corresponding with synthetic images comprises a PNG compression method.

6. The method of claim 1, wherein the step of detecting said updated region in said frame containing data from said multimedia data source is performed by examining a memory device of said multimedia data source, and comparing history data between successive instances of examination to detect said updated region.

7. The method of claim 1, further comprising determining said corresponding compression method by reference to characteristics of said transmission channel.

8. The method of claim 1, further comprising adjusting a magnification of an image of said updated region.

9. The method of claim 1, wherein said remote device comprises a projector.

10. The method of claim 1, wherein said remote device comprises a monitor.

11. The method of claim 1, wherein said transmission channel comprises a wireless transmission channel.

12. The method of claim 1, wherein said transmission channel comprises a wired transmission channel.

13. The method of claim 1, wherein the step of updating said display on said remote device according to said compressed data, said coordinates of said updated region, and said type of said corresponding compression method is performed by decompression.

14. An apparatus for displaying multimedia data on a remote device, said apparatus being coupled to a multimedia data source, said apparatus comprising:
 a frame data capturing circuit for capturing data of a frame from said multimedia data source;
 an updated region detection circuit for detecting an updated region in said frame from said data;
 a determining circuit for determining a corresponding compression method according to characteristics of said updated region; and
 a compression circuit for compressing said updated region to obtain compressed data by using said corresponding compression method, wherein said compressed data, coordinates of said updated region, and a type of said corresponding compression method are transmitted to said remote device for updating a display on said remote device.

15. The apparatus of claim 14, wherein said characteristics of said updated region comprise a color entropy of said updated region.

16. The apparatus of claim 15, wherein a threshold value of the color entropy of said updated region is determined by experiment, and when the color entropy of said updated region is higher than said threshold value, then the type of said compression method corresponds with natural images, and when the color entropy of said updated region is lower than said threshold value, then the type of said compression method corresponds with synthetic images.

17. The apparatus of claim 14, further comprising a wireless transmitting circuit for transmitting said compressed data, said coordinates of said updated region, and the type of said corresponding compression method to said remote device.

18. An apparatus for displaying multimedia data on a remote device, said apparatus being coupled to said remote device and a transmission channel, said apparatus comprising:
 a receiving circuit receiving compressed data of an updated region in a frame, coordinates of said updated region, and a type of a compression method from a multimedia data source via said transmission channel, said compression method used to compress said updated region;
 a decompression circuit for decompressing said compressed data to obtain data of said updated region according to said type of said compression method; and
 a display circuit for transmitting said data of said updated region to said remote device according to said coordinates of said updated region for updating a display on said remote device.

19. The apparatus of claim 18, wherein said type of said compression method is determined according to a color entropy of said updated region.

20. The apparatus of claim 19, wherein a threshold value of the color entropy of said updated region is determined by experiment, and when the color entropy of said updated region is higher than said threshold value, then the type of said compression method corresponds with natural images, and when the color entropy of said updated region is lower than said threshold value, then the type of said compression method corresponds with synthetic images.

21. The apparatus of claim 18, wherein said remote device comprises a projector.

* * * * *